(12) United States Patent
Samuelsson et al.

(10) Patent No.: US 8,533,791 B2
(45) Date of Patent: Sep. 10, 2013

(54) SYSTEM AND METHOD FOR SECOND FACTOR AUTHENTICATION SERVICES

(75) Inventors: Jonas Samuelsson, San Diego, CA (US); Allan Camaisa, La Jolla, CA (US)

(73) Assignee: Anakam, Inc., San Diego, CA (US)

( * ) Notice: Subject to any disclaimer, the term of this patent is extended or adjusted under 35 U.S.C. 154(b) by 337 days.

(21) Appl. No.: 12/142,232

(22) Filed: Jun. 19, 2008

(65) Prior Publication Data

US 2008/0250477 A1 Oct. 9, 2008

Related U.S. Application Data

(63) Continuation-in-part of application No. 11/824,694, filed on Jul. 2, 2007, which is a continuation-in-part of application No. 11/257,421, filed on Oct. 24, 2005, which is a continuation-in-part of application No. 11/077,948, filed on Mar. 11, 2005, which is a continuation-in-part of application No. 10/892,584, filed on Jul. 15, 2004, now Pat. No. 7,676,834.

(51) Int. Cl.
  *H04L 29/06* (2006.01)
  *G06F 21/00* (2013.01)

(52) U.S. Cl.
  USPC .......................................................... 726/5

(58) Field of Classification Search
  None
  See application file for complete search history.

(56) References Cited

U.S. PATENT DOCUMENTS

| | | | |
|---|---|---|---|
| 4,869,717 A | 9/1989 | Adair | |
| 5,590,199 A | 12/1996 | Krajewski et al. | |
| 5,737,421 A | 4/1998 | Audebert | |
| 5,802,176 A | 9/1998 | Audebert | |
| 5,887,065 A | 3/1999 | Audebert | |
| 5,937,068 A | 8/1999 | Audebert | |
| 5,982,898 A | 11/1999 | Hsu et al. | |
| 6,035,404 A | 3/2000 | Zhao | |
| 6,047,268 A | 4/2000 | Bartoli et al. | |
| 6,076,163 A | 6/2000 | Hoffstein | |
| 6,085,320 A | 7/2000 | Kaliski | |
| 6,130,621 A | 10/2000 | Weiss | |
| 6,157,920 A | 12/2000 | Jakobsson | |
| 6,189,098 B1 | 2/2001 | Kaliski | |
| 6,202,159 B1 | 3/2001 | Ghafir et al. | |

(Continued)

FOREIGN PATENT DOCUMENTS

| | | |
|---|---|---|
| EP | 1766839 | 3/2013 |
| WO | 03/007571 | 1/2003 |
| WO | 2003/007571 | 1/2003 |
| WO | 2010127263 | 11/2010 |

OTHER PUBLICATIONS

David M. Piscitello, Lisa Phifer, "Best Practices for securing enterprise network", Business Communications Review, Hinsdale: Dec. 2002. vol. 32, Iss. 12; p. 32, 8 pgs.

(Continued)

*Primary Examiner* — Gilberto Barron, Jr.
*Assistant Examiner* — Simon Kanaan
(74) *Attorney, Agent, or Firm* — Kilpatrick Townsend & Stockton LLP

(57) ABSTRACT

A customer server receives a client request to access protected resources over the Internet. First factor authentication is performed and if it is successful a vendor authentication engine is invoked to undertake second factor authentication. The results of the second factor authentication are returned to the customer server, which grants access only if both first and second factor authentication succeeds.

12 Claims, 3 Drawing Sheets

(56) References Cited

U.S. PATENT DOCUMENTS

| | | | |
|---|---|---|---|
| 6,240,184 B1 | 5/2001 | Huynh | |
| 6,269,163 B1 | 7/2001 | Rivest | |
| 6,286,022 B1 | 9/2001 | Kaliski | |
| 6,301,362 B1 | 10/2001 | Matyas et al. | |
| 6,308,268 B1 | 10/2001 | Audebert | |
| 6,317,777 B1 | 11/2001 | Skarbo | |
| 6,373,969 B1 | 4/2002 | Adler | |
| 6,374,359 B1* | 4/2002 | Shrader et al. | 726/5 |
| 6,389,442 B1 | 5/2002 | Yin | |
| 6,393,447 B1 | 5/2002 | Jakobsson | |
| 6,411,715 B1 | 6/2002 | Liskov | |
| 6,429,927 B1 | 8/2002 | Borza | |
| 6,434,259 B1 | 8/2002 | Hamid | |
| 6,446,052 B1 | 9/2002 | Juels | |
| 6,446,210 B1 | 9/2002 | Borza | |
| 6,460,141 B1 | 10/2002 | Olden | |
| 6,498,861 B1 | 12/2002 | Hamid | |
| 6,584,505 B1 | 6/2003 | Howard et al. | |
| 6,598,072 B1 | 7/2003 | McBrearty et al. | |
| 6,662,231 B1 | 12/2003 | Drosset et al. | |
| 6,694,436 B1 | 2/2004 | Audebert | |
| 6,700,606 B1 | 3/2004 | Borza | |
| 6,721,891 B1 | 4/2004 | Borza | |
| 6,751,654 B2 | 6/2004 | Massarani | |
| 6,760,844 B1 | 7/2004 | McCarthy et al. | |
| 6,769,068 B1 | 7/2004 | Brozowski et al. | |
| 6,772,954 B2 | 8/2004 | Boyer | |
| 6,813,354 B1 | 11/2004 | Jakobsson | |
| 6,831,980 B1 | 12/2004 | Borza | |
| 6,836,845 B1 | 12/2004 | Lennie et al. | |
| 6,848,052 B2 | 1/2005 | Hamid et al. | |
| 6,857,078 B2 | 2/2005 | Colvin | |
| 7,032,026 B1 | 4/2006 | Biswas | |
| 7,100,049 B2 | 8/2006 | Gasparini et al. | |
| 7,275,263 B2* | 9/2007 | Bajikar et al. | 726/28 |
| 7,345,775 B2 | 3/2008 | Kimura | |
| 7,346,775 B2 | 3/2008 | Gasparinl et al. | |
| 7,360,096 B2 | 4/2008 | Bracewell et al. | |
| 7,418,596 B1 | 8/2008 | Carroll | |
| 7,426,530 B1 | 9/2008 | Rosko | |
| 7,437,408 B2 | 10/2008 | Schwartz et al. | |
| 7,536,433 B2 | 5/2009 | Reilly | |
| 7,571,466 B2 | 8/2009 | Mitchell et al. | |
| 7,665,127 B1 | 2/2010 | Rao | |
| 7,676,834 B2 | 3/2010 | Camaisa | |
| 7,685,631 B1 | 3/2010 | Paya et al. | |
| 7,725,490 B2 | 5/2010 | Hitchen et al. | |
| RE41,546 E | 8/2010 | Vainstein | |
| 7,813,986 B2 | 10/2010 | Gardner et al. | |
| 7,822,989 B2 | 10/2010 | Libin et al. | |
| 7,840,573 B2 | 11/2010 | Adams et al. | |
| 8,006,300 B2 | 8/2011 | Mizrah | |
| 8,078,873 B2 | 12/2011 | Shah et al. | |
| 8,079,070 B2 | 12/2011 | Camaisa | |
| 8,219,822 B2 | 7/2012 | Camaisa et al. | |
| 8,296,562 B2 | 10/2012 | Williams et al. | |
| 2001/0014895 A1 | 8/2001 | Sappal | |
| 2001/0029585 A1 | 10/2001 | Simon et al. | |
| 2001/0036297 A1 | 11/2001 | Ikegami et al. | |
| 2001/0037451 A1 | 11/2001 | Bhagavatula | |
| 2001/0037466 A1* | 11/2001 | Fukutake et al. | 713/201 |
| 2001/0044896 A1* | 11/2001 | Schwartz et al. | 713/169 |
| 2002/0029279 A1 | 3/2002 | Campbell et al. | |
| 2002/0031230 A1 | 3/2002 | Sweet et al. | |
| 2002/0059425 A1 | 5/2002 | Bellfiore | |
| 2002/0073042 A1* | 6/2002 | Maritzen et al. | 705/64 |
| 2002/0131402 A1 | 9/2002 | Lee | |
| 2002/0133706 A1 | 9/2002 | Khanna et al. | |
| 2002/0169961 A1* | 11/2002 | Giles et al. | 713/175 |
| 2002/0169988 A1 | 11/2002 | Vandergeest et al. | |
| 2002/0184496 A1 | 12/2002 | Mitchell et al. | |
| 2003/0005308 A1 | 1/2003 | Rathbun et al. | |
| 2003/0018707 A1 | 1/2003 | Flocken | |
| 2003/0033245 A1 | 2/2003 | Kahr | |
| 2003/0046551 A1* | 3/2003 | Brennan | 713/185 |
| 2003/0093430 A1 | 5/2003 | Mottur | |
| 2003/0097573 A1 | 5/2003 | Wheeler | |
| 2003/0140230 A1 | 7/2003 | De Jong et al. | |
| 2003/0149900 A1 | 8/2003 | Glassman et al. | |
| 2003/0154406 A1 | 8/2003 | Honarvar et al. | |
| 2003/0159068 A1 | 8/2003 | Halpin et al. | |
| 2003/0163739 A1 | 8/2003 | Armington et al. | |
| 2003/0177351 A1 | 9/2003 | Skingle | |
| 2003/0188186 A1 | 10/2003 | Cherry | |
| 2003/0200202 A1 | 10/2003 | Hsiao | |
| 2003/0217288 A1 | 11/2003 | Guo et al. | |
| 2003/0229782 A1 | 12/2003 | Bible, Jr. et al. | |
| 2004/0059951 A1 | 3/2004 | Pinkas et al. | |
| 2004/0098609 A1 | 5/2004 | Bracewell et al. | |
| 2004/0103203 A1 | 5/2004 | Nichols et al. | |
| 2004/0103297 A1 | 5/2004 | Risan et al. | |
| 2004/0103300 A1 | 5/2004 | Risan et al. | |
| 2004/0111621 A1 | 6/2004 | Himberger et al. | |
| 2004/0123103 A1 | 6/2004 | Risan et al. | |
| 2004/0136510 A1 | 7/2004 | Vander Veen | |
| 2004/0139318 A1 | 7/2004 | Fiala et al. | |
| 2004/0143523 A1 | 7/2004 | Pegaz-Paquet | |
| 2004/0168083 A1 | 8/2004 | Gasparini et al. | |
| 2004/0172535 A1 | 9/2004 | Jakobsson | |
| 2004/0186995 A1 | 9/2004 | Yim et al. | |
| 2004/0187018 A1 | 9/2004 | Owen et al. | |
| 2004/0250076 A1 | 12/2004 | Kung | |
| 2005/0015601 A1 | 1/2005 | Tabi | |
| 2005/0054994 A1 | 3/2005 | Cioanta et al. | |
| 2005/0108551 A1 | 5/2005 | Toomey | |
| 2005/0138109 A1 | 6/2005 | Redlich et al. | |
| 2005/0154887 A1 | 7/2005 | Birk et al. | |
| 2005/0160042 A1 | 7/2005 | Russell et al. | |
| 2005/0165276 A1 | 7/2005 | Belson et al. | |
| 2005/0176449 A1 | 8/2005 | Cui et al. | |
| 2005/0177730 A1 | 8/2005 | Davenport et al. | |
| 2005/0183032 A1 | 8/2005 | Bushey | |
| 2005/0228993 A1 | 10/2005 | Silvester et al. | |
| 2005/0268100 A1 | 12/2005 | Gasparini et al. | |
| 2005/0268107 A1 | 12/2005 | Harris | |
| 2005/0269401 A1 | 12/2005 | Spitzer et al. | |
| 2006/0015742 A1 | 1/2006 | Camaisa et al. | |
| 2006/0015743 A1 | 1/2006 | Camaisa | |
| 2006/0069921 A1 | 3/2006 | Camaisa | |
| 2006/0106605 A1 | 5/2006 | Saunders et al. | |
| 2006/0206709 A1 | 9/2006 | Labrou et al. | |
| 2007/0123840 A1 | 5/2007 | Cox | |
| 2007/0136517 A1 | 6/2007 | Edling | |
| 2007/0136573 A1 | 6/2007 | Steinberg | |
| 2007/0163585 A1 | 7/2007 | Uesugi et al. | |
| 2007/0180496 A1 | 8/2007 | Fransdonk | |
| 2007/0203517 A1 | 8/2007 | Williams et al. | |
| 2007/0266257 A1 | 11/2007 | Camaisa et al. | |
| 2008/0091682 A1 | 4/2008 | Lim | |
| 2008/0098464 A1 | 4/2008 | Mizrah | |
| 2008/0114980 A1 | 5/2008 | Sridhar | |
| 2008/0189776 A1 | 8/2008 | Constable | |
| 2008/0201159 A1 | 8/2008 | Gabrick et al. | |
| 2008/0301570 A1 | 12/2008 | Milstead et al. | |
| 2009/0094674 A1 | 4/2009 | Schwartz et al. | |
| 2009/0167486 A1 | 7/2009 | Shah et al. | |
| 2009/0235339 A1 | 9/2009 | Mennes et al. | |
| 2009/0259848 A1 | 10/2009 | Williams | |
| 2009/0327724 A1 | 12/2009 | Shah et al. | |
| 2010/0100967 A1 | 4/2010 | Douglas | |
| 2010/0185860 A1 | 7/2010 | Mishra et al. | |

OTHER PUBLICATIONS

Rodry, "Cookie based authentication: is it secure?", Published on Aug. 28, 2000, http://www.perimonks.org?node.sub.-id=29928, Retrieved data Apr. 10, 2009.

Allan Camaisa, et al. "System and method for blocking unauthorized network log in using stolen password", File History of co-pending U.S. Appl. No. 11/824,694, filed Jul. 2, 2007.

Allan Camaisa, Jonas Samuelsson, "System and Method for Blocking Unauthorized Network Log in Using Stolen Password", Non-final Office action dated Jan. 10, 2011 from co-pending U.S. Appl. No. 11/824,694, filed Jul. 2, 2007.

Allan Camaisa, Jonas Samuelsson, "System and Method for Blocking Unauthorized Network Log in Using Stolen Password", Amendment filed Jan. 19, 2011 in response to Non-final Office action dated Jan. 10, 2011 from co-pending U.S. Appl. No. 11/824,694, filed Jul. 2, 2007.
Non-Final Office Action for U.S. Appl. No. 11/077,948, mailed Oct. 16, 2008.
Non-Final Office Action for U.S. Appl. No. 11/077,948, mailed Apr. 9, 2009.
Non-Final Office Action for U.S. Appl. No. 11/077,948, mailed Jul. 16, 2009.
Final Office Action for U.S. Appl. No. 11/077,948, mailed Dec. 7, 2010.
Non-Final Office Action for U.S. Appl. No. 11/077,948, mailed Jan. 24, 2011.
Non-Final Office Action for U.S. Appl. No. 11/257,421, mailed Dec. 29, 2008 (12 pages).
Final Office Action for U.S. Appl. No. 11/257,421, mailed Apr. 20, 2009 (21 pages).
Non-Final Office Action for U.S. Appl. No. 11/257,421, mailed Oct. 19, 2009 (20 pages).
Non-Final Office Action for U.S. Appl. No. 11/257,421, mailed Apr. 14, 2010 (25 pages).
Final Office Action for U.S. Appl. No. 11/257,421, mailed Jul. 7, 2010 (29 pages).
Final Office action for U.S. Appl. No. 11/824,694, mailed Mar. 1, 2011 (33 pages).
Non-final Office Action for U.S. Appl. No. 11/824,694, mailed Jan. 10, 2011 (30 pages).
Response to Office Action for U.S. Appl. No. 11/077,948, filed Jan. 4, 2011 (8 pages).
Response to Office Action for U.S. Appl. No. 11/077,948, filed Jan. 7, 2009 (4 pages).
Response to Office Action for U.S. Appl. No. 11/077,948, filed May 7, 2009 (4 pages).
Amendment and Response to Non-Final Office Action for U.S. Appl. No. 11/077,948, filed May 25, 2011 (14 pages).
Response to Office Action for U.S. Appl. No. 11/077,948, filed Oct. 5, 2009 (6 pages).
Amendment and Supplemental Response to Office Action for U.S. Appl. No. 11/077,948, filed Nov. 12, 2009 (7 pages).
Response to Office Action for U.S. Appl. No. 11/257,421, filed Oct. 20, 2009 (3 pages).
Response to Office Action for U.S. Appl. No. 11/257,421, filed Jan. 15, 2009 (5 pages).
Response to Office Action for U.S. Appl. No. 11/257,421, filed Jan. 16, 2009 (5 pages).
Response to Office Action for U.S. Appl. No. 11/257,421, filed Apr. 16, 2010 (8 pages).
Response to Office Action for U.S. Appl. No. 11/257,421, filed Oct. 4, 2010 (3 pages).
Response to Office Action for U.S. Appl. No. 11/824,694, filed Jun. 25, 2010 (18 pages).
Amendment and Response to Final Office Action for U.S. Appl. No. 11/824,694, filed Jul. 1, 2011 (22 pages).
Response to Office Action for U.S. Appl. No. 11/824,694, filed Dec. 2, 2010 (12 pages).
Response to Office Action for U.S. Appl. No. 11/824,694, filed Jan. 19, 2011 (14 pages).
File History for U.S. Appl. No. 10/892,584 (487 pages).
U.S. Appl. No. 11/824,694, "Office Action" mailed Jul. 30, 2012 (38 pages).
European Patent Application No. 05750620.6, "Communication Pursuant to Article 94(3) EPC" mailed Dec. 23, 2010 (5 pages).
European Patent Application No. 05750620.6, "Invitation Pursuant to Article 94(3) and Rule 71(1) EPC" mailed May 4, 2012 (2 pages).
European Patent Application No. 05750620.6, "Office Action Response", filed Jun. 9, 2011 (2 pages).
U.S. Appl. No. 11/077,948, Notice of Allowance mailed Aug. 12, 2011 (11 pages).
U.S. Appl. No. 11/257,421, Office Action mailed Nov. 28, 2011 (6 pages).
U.S. Appl. No. 11/824,694, Office Action mailed Sep. 19, 2011 (27 pages).
U.S. Appl. No. 12/434,442, Office Action mailed Dec. 16, 2011 (10 pages).
U.S. Appl. No. 12/475,028, Office Action mailed Jan. 5, 2012 (12 pages).
Amendment and Response to Non-Final Office Action for U.S. Appl. No. 11/824,694, filed Jan. 19, 2012 (31 pages).
Notice of Allowance for U.S. Appl. No. 11/257,421, mailed Mar. 19, 2012 (5 pages).
Final Office Action for U.S. Appl. No. 11/824,694 mailed Mar. 29, 2012 (34 pages).
Notice of Allowance for U.S. Appl. No. 12/434,442 mailed Jun. 26, 2012 (17 pages).
Amendment and Response to Non-Final Office Action for U.S. Appl. No. 12/475,028, filed Jul. 3, 2012 (11 Pages).
U.S. Appl. No. 11/824,694, Office Action, mailed Feb. 5, 2013 (42 pages).
U.S. Appl. No. 12/475,028, "Office Action", mailed Oct. 15, 2012 (22 pages).
U.S. Appl. No. 11/824,694, "Notice of Allowance", mailed Apr. 29, 2013, 18 pages.

* cited by examiner

ARCHITECTURE

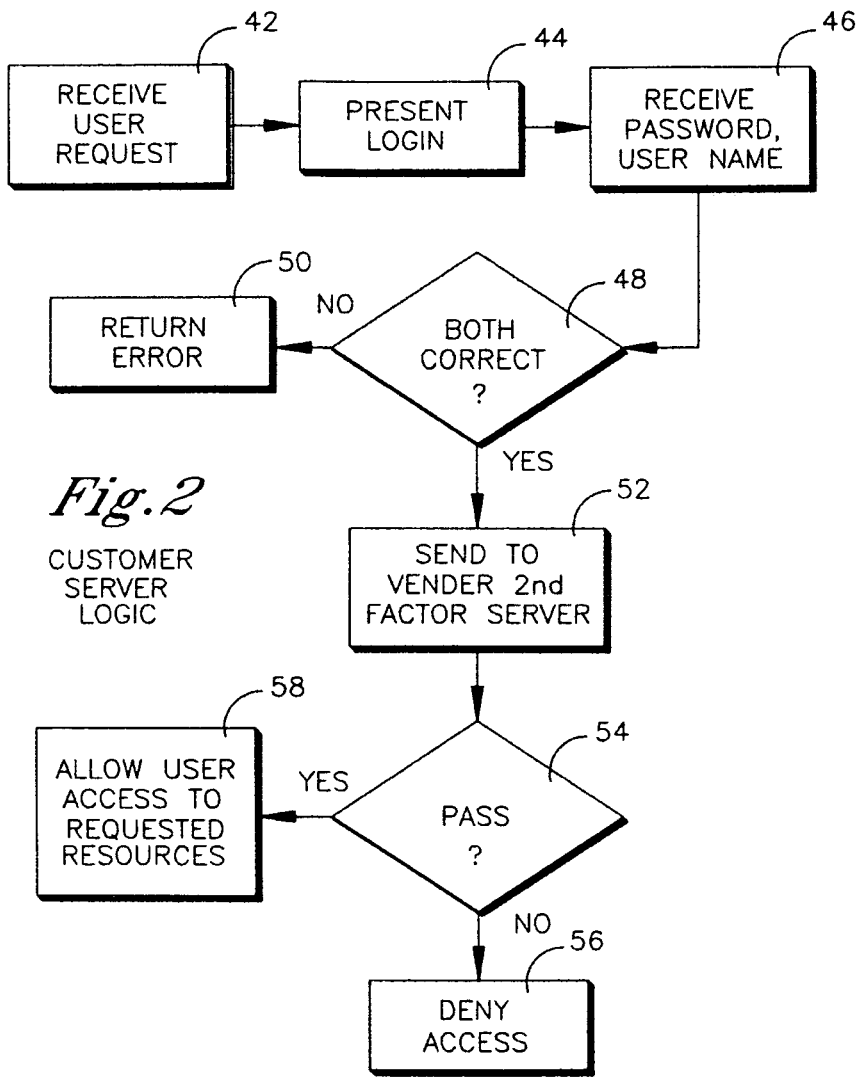

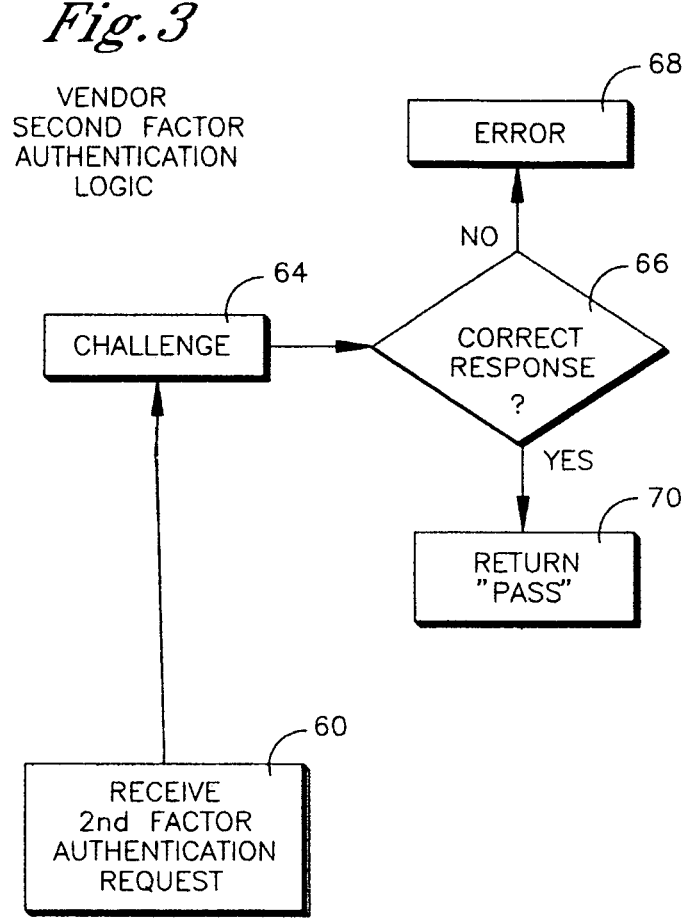

SYSTEM AND METHOD FOR SECOND FACTOR AUTHENTICATION SERVICES

RELATED APPLICATIONS

This application is a continuation-in-part of and claims priority from co-pending U.S. patent application Ser. No. 11/824,694, filed Jul. 2, 2007, which is a continuation-in-part of U.S. patent application Ser. No. 11/257,421, filed Oct. 24, 2005, which is a continuation-in-part of U.S. patent application Ser. No. 11/077,948, flied Mar. 11, 2005, which in turn is a CIP of Ser. No. 10/892,584, filed Jul. 15, 2004 now U.S. Pat. No. 7,676,834, all of which are incorporated herein by reference and from all of which is priority claimed.

FIELD OF THE INVENTION

The present invention relates generally to providing secure access to a website with sensitive data.

BACKGROUND OF THE INVENTION

The parent applications referenced above recognize the importance of providing more than simple user name/password protection for sensitive online data, and accordingly provide minimally intrusive second factor authentication systems and methods. As understood herein, some customers may prefer to handle first factor authentication (user name and password) themselves and use a vendor second-factor authentication in conjunction therewith.

SUMMARY OF THE INVENTION

A method for selectively granting a user access to data includes, at a first authentication server provided by a first vendor, receiving a request for access from a user computer. The method also includes using signals from the user computer to provide first factor authentication of the user. Only if first factor authentication is successful, a second factor authentication engine provided by a second vendor different from the first vendor is used to provide second factor authentication of the user. The user is granted access to the data only if second factor authentication is successful.

The first factor authentication may be executed by the first authentication server and may include testing for correct user name and password. The second factor authentication may include determining whether a previously submitted one-time pass code is valid. The pass code is generated as soon as the first factor authentication is successful and is delivered out-of-band by email, cell phone (SMS text message), or voice (interactive voice response (IVR)). The pass code is for one-time use and may have a time expiration associated with it.

In another aspect, a second factor authentication engine is disclosed on a tangible computer readable medium executable by a processor to execute logic. The logic includes receiving from a customer's system an indication that a user name of a user and an associated password have been verified, and undertaking second factor authentication of the user on behalf of the customer. The logic also includes returning to the customer system an indication of results of second factor authentication.

In another aspect, a server has a processor and a tangible computer readable medium accessible by the processor and bearing instructions embodying logic. The logic includes receiving a user request to access information and in response to the request, causing a user name and password received from the user to be authenticated. If the user name and password are not authenticated, the logic denies the user access to the information. Only if the user name and password are authenticated, a vendor authentication engine undertakes a second factor authentication and generates a result and the logic receives the result from the engine. If the result indicates that second factor authentication fails, the logic denies the user access to the information, but otherwise grants the user access to the information.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart of the customer server logic;
and
FIG. 3 is a flow chart of the vendor server logic.

DETAILED DESCRIPTION OF THE PREFERRED EMBODIMENT

Figure 1:
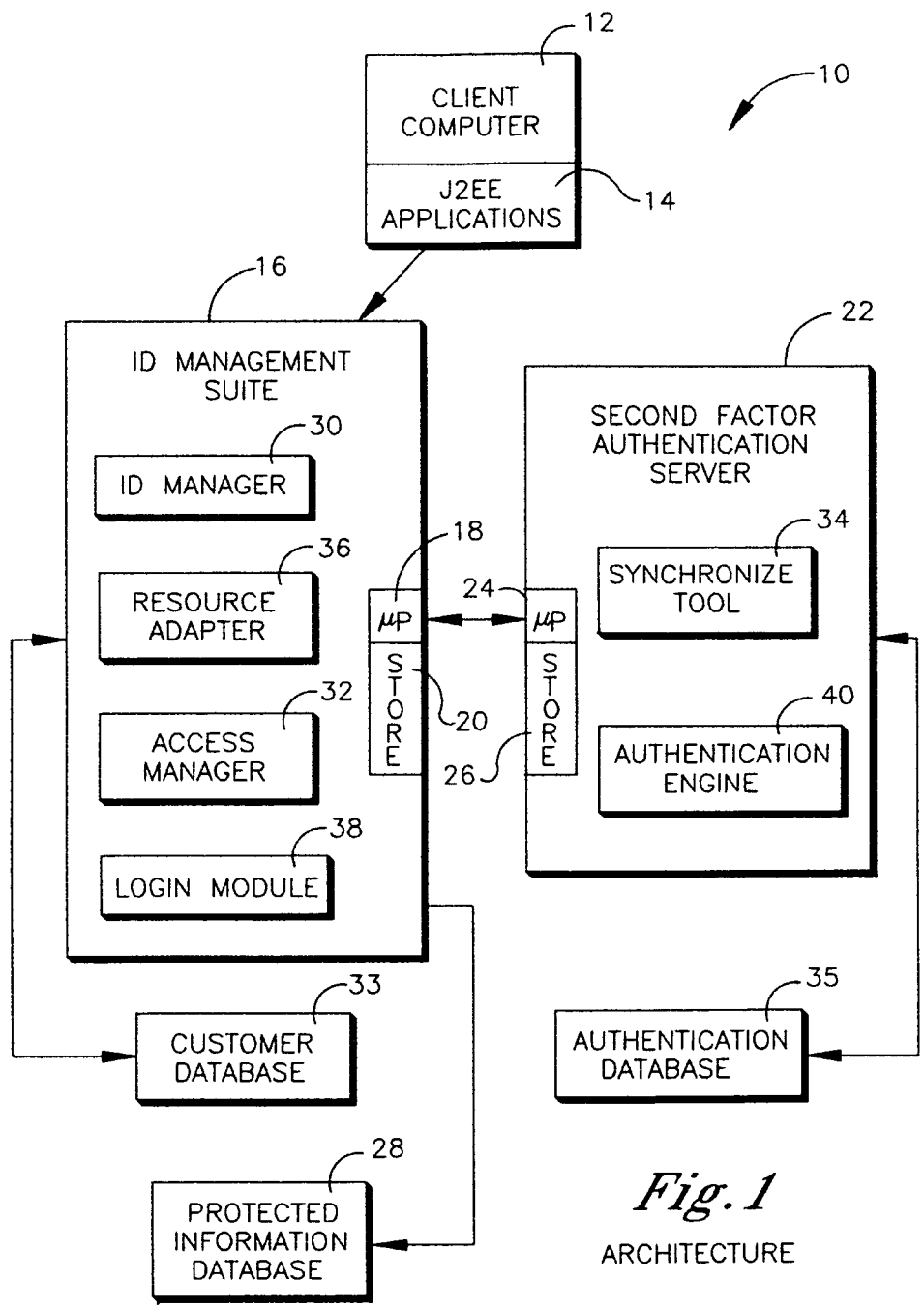
FIG. 1 is a block diagram of an exemplary system for implementing the present invention.

Referring initially to FIG. 1, a system is shown, generally designated 10, which supports resource requests by client computers 12 executing, in one implementation, Java 2 platform, enterprise edition (J2EE) applications 14. The requests are sent to a customer server 16 having one or more server processors 18 accessing one or more tangible computer readable media 20 bearing instructions including portions of the logic discussed below. The media 20 may be, without limitation, solid state memory, disk-based memory, or other memory or combination thereof.

As set forth further below, the customer server 16 executes first factor authentication of the user of the client computer 12, and if first factor authentication is successful, accesses a vendor-provided second factor authentication server 22 that may include one or more processors 24 accessing one or more tangible computer readable media 26 bearing instructions including portions of the logic discussed below. The media 26 may be, without limitation, solid state memory, disk-based memory, or other memory or combination thereof. Only if both first- and second-factor authentication is successful is the client computer 12 permitted to access a protected information database 28 associated with the customer server 16. In some embodiments the second factor authentication server 22 may execute both first- and second-factor authentication.

In one example embodiment the customer server 16 may execute a Java Identity Management Suite including a Java System Identity Manager (IDM) 30 and a Java System Access Manager (AM) 32 from, e.g., Sun Microsystems, to provide integrated user provisioning, de-provisioning, and identities management as discussed below. The AM 32, in an example embodiment, can be used to handle the first factor authentication process, which can be, e.g., requesting entry of a user name and password by the client computer 12 and then determining whether the user name and password match an approved user name and password in a user database 33 accessible to the customer server 16. On the other hand, the IDM 30 can be used to provision and de-provision users for second factor authentication by communicating user data to a synchronization utility 34 in the second factor authentication server 22. In non-limiting embodiments the user data sent from the IDM 30 to the utility 34 may include, e.g., user name, user email address, user home/office phone number, user mobile phone number and carrier, user's actual first and last names, user's address, and user's authentication profile as discussed further below. The user data may be stored in a database 35 accessible to the second factor authentication server 22.

Thus, the user data in the database 35 is collected not by the second factor authentication server 22 but by the customer server 16. The user data is uploaded to the database 35, with a synchronous connection being maintained between the customer server 16 and second factor authentication server 22 during operations. User self-registration may also be provided in which each user enters his two-factor data directly into the second factor authentication server 22.

Additionally, as shown in FIG. 1 the customer server 16 may include an IDM Resource Adapter 36, which functions as an interface to external subsystems and applications, translating and converting data between the systems into the proper format needed by each system.

Furthermore, the customer server 16 may include a vendor-provided login module 38, typically provided by the same vendor providing the second factor authentication programming of the second factor authentication server 22. In example non-limiting implementation the login module 38 is a Java Authentication and Authorization Service (JAAS)-compliant module that is used to facilitate providing second factor authentication services to the AM 32 by communicating with a second factor authentication engine 40 in the second factor authentication server 22 when first factor authentication executed by the AM 32 is successful. In some embodiments the second factor authentication server 22 may return, pursuant to execution of second factor authentication, HTML snippets that are transformed by the login module 38 into a format suitable for use via AM 32 callback routines. The login module 38 also transforms values from the customer server 16 into a format suitable for use with the second factor authentication engine 40.

FIG. 2 shows logic that may be executed by the customer server 16 in one implementation. Commencing at block 42, a user request for access to protected information in the database 28 is received from the client computer 12 by the customer server 16, typically over the Internet. At block 44 the customer server 16 presents a login screen to the client computer 12 prompting the user to enter a user name and password, and assuming the user enters a user name and password, this information is received by the customer server 16 at block 46.

At decision diamond 48 it is determined whether both the username and password are correct, i.e., whether they match a paired entry in a user database. The decision at diamond 48 may be executed by the customer server 16 using, e.g., the AM 32, or the login module 38 of the customer server 16 may pass the user name and password to the second factor authentication server 22, which makes the determination at diamond 48. If either the user name or password is incorrect (in some embodiments, after a predetermined number of retries), an error is returned at state 50.

Otherwise, first factor authentication of the user is successful and the logic flows to block 52 to send a request for second factor authentication of the user to the second factor authentication server 22. Details of this second factor test are discussed further below in reference to FIG. 3. If the second factor authentication test fails, the user is denied access to the requested information at block 56, but only if both first- and second-factor authentication are successful is the user granted access to the requested resources at state 58.

Turning to second factor authentication and FIG. 3, at block 60 the request for second factor authentication pursuant to a successful first factor authentication is received at the second factor authentication server 22. At block 64 a challenge is issued. The challenge may include, but is not limited to: pass code challenge with various delivery options, e.g., phone text message, email message, interactive voice response (IVR), etc.; security question challenges; challenges based on geographic location; mutual authentication; etc. Which challenge to use is defined by the customer server 16 as part of the user profile given to the second factor authentication server 22.

For instance, an email or wireless telephone short message service (SMS) message or outbound telephone call using Interactive Voice Response (IVR) principles can be sent to the user, containing a randomly generated single-use only pass code which is supplied by the second factor authentication server 22. This pass code can then be sent by the user to the second factor authentication server 22 using the client computer 12, to prove that the user is authorized access. Or, a biometric information test may also be used to trigger this challenge or indeed after reception of the pass code to further verify user authenticity. Details of non-limiting biometric and geographic second factor authentication are set forth in one or more of the above-referenced patent applications.

If a correct response to the challenge is not received at decision diamond 66 (e.g., within a predetermined response period), an error is returned at state 68, and the user is denied access to the requested resources at block 56 of FIG. 3. The error result alternatively may entail directing the user back to the first factor authentication process described above. On the other hand, a positive result at diamond 66 moves the logic to block 70, wherein a "pass" is returned indicating that second factor authentication is successful. The user is granted access to the requested resources.

While the particular SYSTEM AND METHOD FOR SECOND FACTOR AUTHENTICATION SERVICES is herein shown and described in detail, it is to be understood that the subject matter which is encompassed by the present invention is limited only by the claims.

What is claimed is:

1. A method, comprising:
receiving a request to perform a second factor authentication from a first
authentication server subsequent to a successful first factor authentication of a user computer by the first authentication server; and
responsive to receiving the request, performing, by a second authentication server that is separate from the first authentication server, the second factor authentication of the user computer subsequent to the successful first factor authentication by the first authentication server, the second factor authentication comprising:
outputting a challenge to the user computer, the challenge being a type of challenge selected by the first authentication server from a plurality of types of challenges that the second authentication server is configured to output, wherein outputting the challenge to the user computer comprises establishing a direct communication channel between the second authentication server and the user computer;
receiving a response from the user computer to the challenge; and
performing at least one of:
responsive to determining the response from the user computer to the challenge is correct, outputting an indication to the first authentication server that the user computer passed the second factor authentication, or
responsive to determining the response from the user computer to the challenge is incorrect, outputting an indication to the first authentication server that the user computer failed the second factor authentication.

2. The method of claim 1, wherein the first factor authentication comprises testing for correct user name and password received from the user computer.

3. The method of claim 2, wherein the plurality of types of challenges comprise a security question.

4. The method of claim 1, wherein the challenge is outputted by a transmission method selected from the group consisting of:
   a telephone text message;
   an email message; and
   an interactive voice response.

5. The method of claim 1, wherein the plurality of types of challenges comprise a security question.

6. A customer server comprising:
   at least one processor;
   at least one tangible computer readable medium accessible by the at least one processor and having instructions embodying logic that when executed by the at least one processor are configured to cause the customer server to:
   receive from a user computer a request to access information on the customer server, the request comprising a user name and a password for a user;
   respond to the user name and the password not matching data stored for the user by denying the user computer access to the information on the customer server;
   respond to the user name and the password matching data stored for the user by outputting a command to a Vendor authentication server to perform a second factor authentication of the user using a type of challenge selected by the customer server from a plurality of types of challenges that the vendor authentication server is configured to perform, wherein performing the second factor authentication comprises establishing a direct communication channel between the vendor authentication server and the user computer;
   respond to receiving from the vendor authentication server an indication that the user failed the second factor authentication by denying the user computer access to the information on the customer server; and
   respond to receiving from the vendor authentication server an indication that the user passed the second factor authentication by granting the user computer access to the information on the customer server.

7. The customer server of claim 6, wherein the plurality of types of challenges comprise a security question.

8. A second authentication server device, comprising:
   a tangible computer-readable media having code stored thereon; and
   at least one processor configured for executing the code to cause the second authentication server device to:
   receive a request to perform a second factor authentication from a first authentication server device subsequent to a successful first factor authentication of a user computer by the first authentication server device, wherein the second authentication server device is separate from the first authentication server device; and
   perform the second factor authentication of the user computer responsive to receiving the request and subsequent to the successful first factor authentication by the first authentication server device, wherein the second factor authentication comprises:
   outputting a challenge to the seer computer, the challenge being a type of challenge selected by the first authentication server device from a plurality of types of challenges that the second authentication server device is configured to output, wherein outputting the challenge to the user computer comprises establishing a direct communication channel between the second authentication server device and the user computer;
   responsive to determining the response from the user computer to the challenge is correct, outputting an indication to the first authentication server device that the user computer passed the second factor authentication; and
   responsive to determining the response from the user computer to the challenge is incorrect, outputting an indication to the first authentication server device that the user computer failed the second factor authentication.

9. The second authentication server device of claim 8, wherein the first factor authentication comprises testing for correct user name and password received from the user computer.

10. The second authentication server device of claim 9, wherein the plurality of types of challenges comprise a security question.

11. The second authentication server device of claim 8, wherein the challenge is outputted by a transmission method selected from the group consisting of:
    a telephone text message;
    an email message; and
    an interactive voice response.

12. The second authentication server device of claim 8, wherein the plurality of types of challenges comprise a security question.

* * * * *

UNITED STATES PATENT AND TRADEMARK OFFICE
CERTIFICATE OF CORRECTION

PATENT NO. : 8,533,791 B2  Page 1 of 1
APPLICATION NO. : 12/142232
DATED : September 10, 2013
INVENTOR(S) : Jonas Samuelsson and Allan Camaisa It is certified that error appears in the above-identified patent and that said Letters Patent is hereby corrected as shown below:

In the Claims

Claim 6, column 5, line 34, change "Vendor" to "vendor"
Claim 8, column 6, line 19, change "seer" to "user"
Claim 8, column 6, line 27, enter "receiving a response from the user computer to the challenge;" before "responsive to determining the response"

Signed and Sealed this
Twelfth Day of November, 2013

Teresa Stanek Rea
*Deputy Director of the United States Patent and Trademark Office*